US012717355B2

(12) United States Patent
Howard et al.

(10) Patent No.: US 12,717,355 B2
(45) Date of Patent: Aug. 25, 2026

(54) RIDE SYSTEM FEATURING A FREE-RANGE VEHICLE PLATFORM

(71) Applicant: DISNEY ENTERPRISES, INC., Burbank, CA (US)

(72) Inventors: Derek Lee Howard, Burbank, CA (US); Edward Allen Nemeth, Richfield, OH (US)

(73) Assignee: Disney Enterprises, Inc., Burbank, CA (US)

( * ) Notice: Subject to any disclaimer, the term of this patent is extended or adjusted under 35 U.S.C. 154(b) by 118 days.

(21) Appl. No.: 18/830,899

(22) Filed: Sep. 11, 2024

(65) Prior Publication Data

US 2026/0072453 A1 Mar. 12, 2026

(51) Int. Cl.

| | |
|---|---|
| ***G05D 1/82*** | (2024.01) |
| ***A63G 25/00*** | (2006.01) |
| ***G05D 1/69*** | (2024.01) |
| ***G05D 107/30*** | (2024.01) |
| *G05D 105/65* | (2024.01) |

(52) U.S. Cl.

CPC ............... *G05D 1/82* (2024.01); *A63G 25/00* (2013.01); *G05D 1/69* (2024.01); *G05D 2105/65* (2024.01); *G05D 2107/30* (2024.01)

(58) Field of Classification Search

CPC ........ G05D 1/82; G05D 1/69; G05D 2105/65; G05D 2107/30; A63G 25/00

See application file for complete search history.

(56) References Cited

U.S. PATENT DOCUMENTS 7,380,805 B1 * 6/2008 Turner .................. B60G 11/15 280/124.135
7,971,537 B2 * 7/2011 Verl ..................... A63G 31/16 104/53
2014/0277849 A1 * 9/2014 Grant .................... A63G 31/00 701/2
2015/0012157 A1 1/2015 Nemeth et al.
2018/0101998 A1 * 4/2018 Pierce .............. G06F 16/24565
2018/0120862 A1 5/2018 Dembinski et al.

(Continued)

FOREIGN PATENT DOCUMENTS

WO 2026059629 A1 3/2026

OTHER PUBLICATIONS

"International Search Report for PCT Appl. No. PCT/US2025/035231, dated Nov. 5, 2025, 19 pages".

*Primary Examiner* — Ashley L Redhead, Jr.
(74) *Attorney, Agent, or Firm* — Dorsey & Whitney LLP

(57) ABSTRACT

A ride system may include a track including uneven terrain, a plurality of ride vehicles positioned on the track, and a fleet controller (e.g., a wayside controller). The ride vehicles may be adapted to traverse the uneven terrain, such as along a respective chosen path of multiple paths based on respective user control. The user control may be configured to select the chosen path and adjust a speed and a direction of the ride vehicle along the chosen path. The fleet controller may provide an override control of the ride vehicles along the track based on the chosen path, the speed, and the direction of the ride vehicles. The fleet controller may define a default position and pacing for the ride vehicles. The user control may be configured to adjust the position and pacing of an associated ride vehicle from the default position and pacing, respectively.

20 Claims, 5 Drawing Sheets

(56) References Cited

U.S. PATENT DOCUMENTS

| | | | | |
|---|---|---|---|---|
| 2018/0170399 | A1 | 6/2018 | Osterman et al. | |
| 2020/0171397 | A1* | 6/2020 | Krauthamer | A63G 25/00 |
| 2021/0170287 | A1 | 6/2021 | Yamich et al. | |
| 2021/0268984 | A1* | 9/2021 | Krauthamer | A63G 31/00 |
| 2022/0227459 | A1* | 7/2022 | Kauppinen | B62K 3/002 |
| 2022/0399042 | A1* | 12/2022 | Beatch | G11B 27/036 |
| 2023/0195115 | A1 | 6/2023 | Blum et al. | |
| 2024/0104641 | A1* | 3/2024 | Karl | G06Q 30/0282 |
| 2024/0325937 | A1* | 10/2024 | Magpuri | A63G 25/00 |
| 2024/0367062 | A1* | 11/2024 | Hall | A63G 31/00 |
| 2024/0399264 | A1* | 12/2024 | Zamperla | A63G 31/00 |
| 2024/0415080 | A1* | 12/2024 | Wanta | H04W 4/021 |
| 2025/0002058 | A1* | 1/2025 | Mollet | B61B 15/00 |

* cited by examiner

RIDE SYSTEM FEATURING A FREE-RANGE VEHICLE PLATFORM

FIELD

The present application relates to a ride system, such as rides with movable vehicles (e.g., free-range vehicle platforms).

BACKGROUND

Rides or attractions seek to provide an immersive guest experience, such as to accurately or closely simulate the real world in a controlled environment. Existing solutions often fall short of real life simulation, often because of a lack of technology or because of ride characteristics themselves. For example, for rides with movable vehicles, existing solutions may not simulate the physical dynamics of real world vehicles. In addition, existing solutions may not provide guest control, thereby limiting the guest experience.

Therefore a need exists for systems and methods that addresses the concerns above or at least offers an alternative to existing solutions.

BRIEF SUMMARY

In one example, a ride system includes a track including uneven terrain. The ride system further includes a plurality of ride vehicles positioned on the track and adapted to traverse the uneven terrain along a respective chosen path of multiple paths based on respective user control, the user control configured to select the chosen path and adjust a speed and a direction of the ride vehicle along the chosen path. The ride system further includes a fleet controller configured to provide an override control of the ride vehicles along the track based on the chosen path, the speed, and the direction of the ride vehicles.

Optionally, the multiple paths include alternative paths along a section of the track. The alternative paths may provide differing attraction elements from one another. The fleet controller may be configured to control a flow of the ride vehicles along one alternative path based on an anomaly in another alternative path.

Optionally, the fleet controller is configured to override the user control based on a proximity of a ride vehicle to a boundary. The boundary may include a track boundary or a vehicle boundary.

In another example, a ride system includes a track, a plurality of ride vehicles configured to traverse the track, a fleet controller configured to define a default position and a default pacing for the ride vehicles along the track, and a respective user control for the ride vehicles. The user control is configured to adjust the position of an associated ride vehicle from the default position, and adjust the pacing of the associated ride vehicle from the default pacing.

Optionally, the fleet controller is configured to override the adjusted position and the adjusted pacing based on a track threshold.

Optionally, the ride system includes an effect generator configured to generate one or more ride effects off the ride vehicles. The one or more ride effects may bias the ride vehicles to the default position or the default pacing.

Optionally, the ride system includes an effect generator configured to generate, onboard the ride vehicles, one or more ride effects that reinforce at least one of the adjusted position or the adjusted pacing.

Optionally, the track includes uneven ground terrain.

Optionally, the fleet controller is a wayside controller.

In another example, a ride system includes a ride vehicle adapted to traverse uneven ground terrain, and a navigation system configured to control a position of the ride vehicle along the track. The navigation system includes an onboard controller configured to receive a user input for a desired position of the ride vehicle along the track, and a wayside controller in communication with the onboard controller, the wayside controller configured to compare the user input for the desired position against a threshold, and adjust the desired position of the ride vehicle based on the threshold.

Optionally, the wayside controller is configured to adjust a speed and a steering input so that the desired position is within the threshold.

Optionally, the ride system includes a track, wherein the wayside controller defines a default trajectory of the ride vehicle along the track. The wayside controller may be configured to navigate the ride vehicle along the track absent the user input.

Optionally, the desired position includes at least one of a desired speed, a direction, or an acceleration of the ride vehicle. The wayside controller may be configured to adjust the desired speed, direction, or acceleration based on a proximity to a boundary.

Optionally, the wayside controller is configured to override the user input to direct the ride vehicle to an attraction element.

In addition to the exemplary aspects and embodiments described above, further aspects and embodiments will become apparent by reference to the drawings and by study of the following description.

DETAILED DESCRIPTION

The disclosed ride systems provide an immersive and unique guest experience. A ride system may include a ride vehicle, such as a free-ranging vehicle (FRV). FRVs normally operate on planar, flat surfaces, such as due to complexity in navigation and control. The present disclosure evolves the FRV platform to be capable of traversing uneven terrain (e.g., off-road) and grade changes. The capabilities described herein allow for unique off-road type experiences and the ability to traverse up and down hills and orchestrate track paths across multiple vertical levels without use of elevators (e.g., vertical vehicle conveyance). Additionally, or alternatively, guest control may be provided, such as to allow guests to control steering and velocity of the ride vehicle. Override or supervisory control may be provided, such as to limit the guest control for efficient and safe operation of the attraction.

Figure 1:
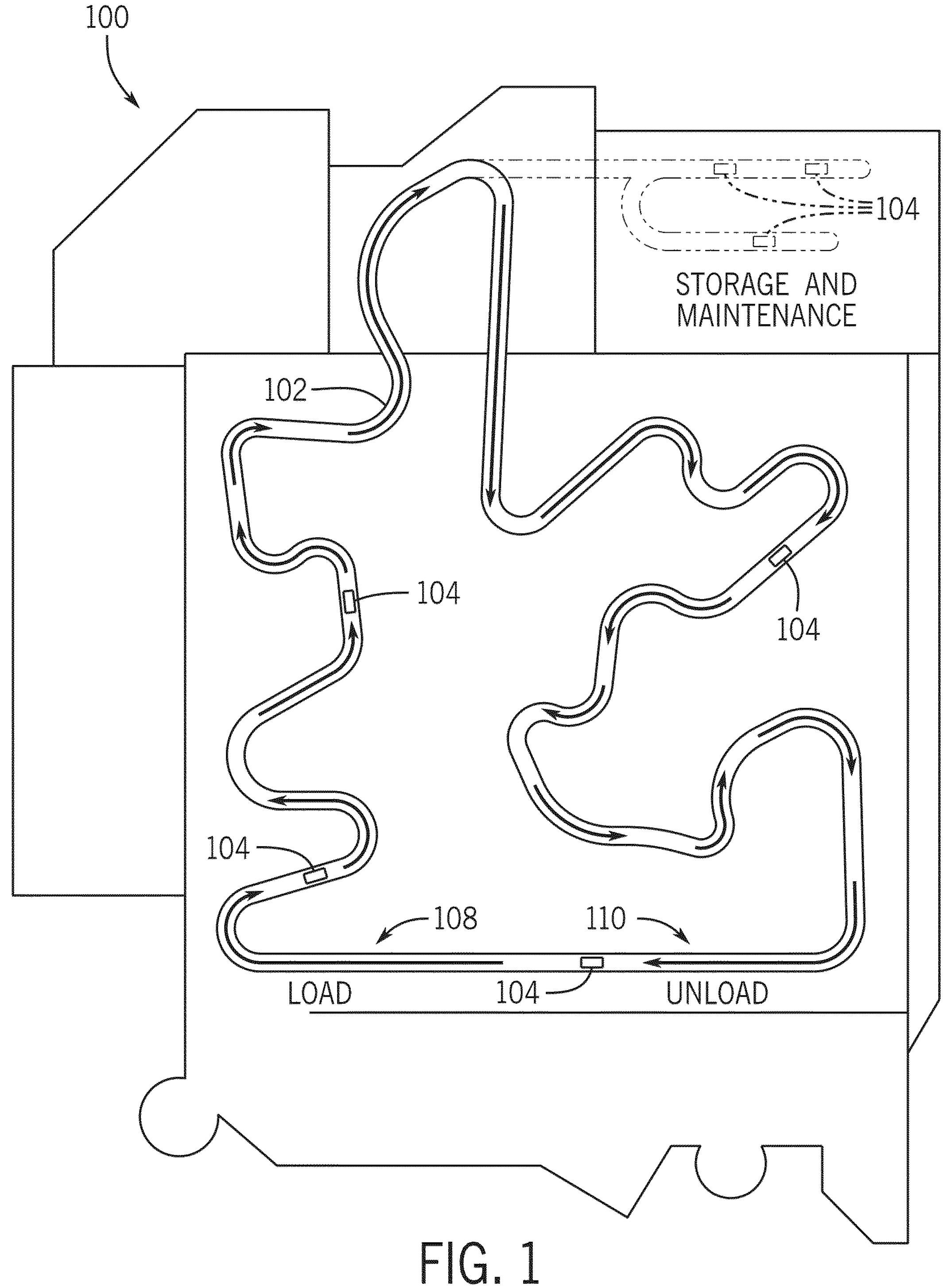
FIG. 1 illustrates an overview of an example ride system.

Turning to the figures, FIG. 1 illustrates an example attraction or ride system 100. The ride system 100 may include a track 102 and a ride vehicle 104 (e.g., a plurality of ride vehicles 104) positioned on the track 102. The ride vehicle 102 is configured to carry one or more passengers or guests, such as through an attraction or ride. For example, the ride vehicle 102 may include a chassis (e.g., to house or receive on or more passengers or guests), on-board suspension, one or more wheels, and other features. The ride vehicle 102 may have different configurations based on applicable restrictions, a ride or attraction theme, a desired guest experience, or the like. For example, the ride vehicle 102 may include an open or closed cockpit, be sized and shaped to mimic a desired vehicle or theme (e.g., air vehicle, water vehicle, ground vehicle, movie vehicle, etc.), be realistic or unrealistic (e.g., imaginary), etc., but generally be configured to receive one or more guests. For example, the cockpit may be configured as a compartment that includes a seating area to allow one or more guests to sit comfortably within the vehicle. In other examples, the cockpit or compartment may include a standing or other position configuration for the guests.

In examples, the track 102 may include a beginning 108 and an end 110, with the ride or attraction beginning at the beginning 108 and ending at the end 110. Depending on the application, the track 102 may define a loop, such that the ride vehicle 104 loops around the track 102 continuously and repeatedly. The beginning 108 may define or include an area allowing guests to board the ride vehicles 104 (e.g., a loading zone, to load the ride vehicles 104), and the end 110 may define or include an area allowing guests to exit the ride vehicles 104 (e.g., an unloading zone, to unload the ride vehicles 104). In examples, the beginning 108 and end 110 may be defined at the same location or area, such as to allow the boarding and exiting of guests at the same time, although other configurations are contemplated.

Traversing the track 102 from the beginning 108 to the end 110, the ride vehicle 104 may provide or facilitate an immersive experience for guests through the attraction. For instance, the guests may experience one or more thematic elements of the attraction, such as the ride vehicles 104 traversing terrain, positioning the guests to view or experience attraction sets or elements, or otherwise providing an enjoyable experience for guests. As detailed below, the guests may provide a degree of input to the ride, such as controlling the ride vehicle 104 to adjust dynamic characteristics as desired (e.g., a speed, a position, an orientation, etc. of the ride vehicles 104 along the ride). At the same time, the ride system 100 may also include an override control, such as to navigate (through override) the ride vehicles 104 relative to one another based on the various independent navigation inputs of respective ride vehicles 104, limit undesired positioning or navigation of the ride vehicles 104, or otherwise facilitate movement of the ride vehicles 104 through the attraction.

Figure 2:
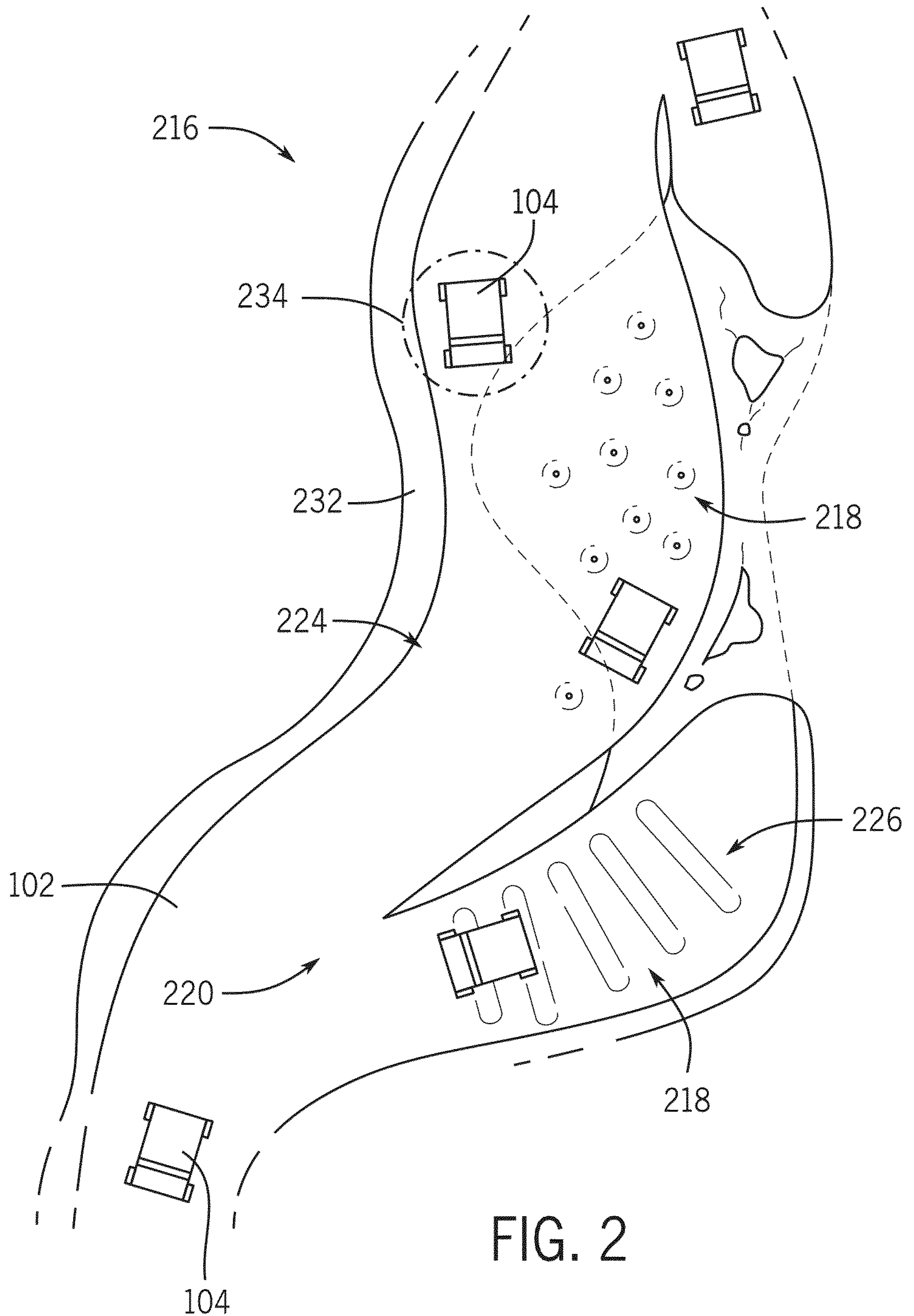
FIG. 2 illustrates an example track section of an example ride system.

Along these lines, FIG. 2 illustrates an example track section 216 of the track 102. Although the features below are described with reference to the track section 216, the features can apply to other sections of the track 102 or throughout the track 102. For example, the track 102 may include uneven terrain 218 (e.g., uneven ground terrain) and multiple paths 220. The uneven terrain 218 may include, without intent to limit, hills, valleys, undulations, berms, bumps, rocks, stumps, puddles, potholes, shrubbery, trees, debris, or the like, such as to simulate a real-world environment (e.g., a desert terrain, a forest terrain, a mountain terrain, a grassland terrain, a back road terrain, a highway terrain, etc.). The ride vehicles 104 may be adapted to traverse the uneven terrain 218. For example, the ride vehicles 104 may be adapted to climb and descend hills, absorb bumps, turn, speed up, slow down, traverse through water, etc. In this manner, one or more dynamics of the ride or attraction may be delivered by the terrain through the ride vehicle 104.

The multiple paths 220 may be different paths through the track section 216, such as alternative paths that can be chosen while traversing the track 102. For example, the track section 216 may include a first path 224 and a second path 226. The first path 224 may be a first route through the track section 216, such as an easier route, a route providing a first set of attraction elements, an upper route, a faster route, etc. The second path 226 may be a second route through the track section 216, such as a more difficult route, a route providing a second set of attraction elements, a lower route, a slower route, etc. In examples, the alternative paths may provide differing attraction elements from one another. For instance, the first path 224 may be an open air environment, whereas the second path 226 may be a cave environment, among other differing environments or configurations. Although two paths 220 are shown, the track section 216 may include additional paths or routes.

The guests may be able to choose a desired path, such as the ride vehicles 104 including respective user control. For example, the ride vehicle 104 may include an onboard controller configured to receive a user input for a desired position (e.g., speed, direction, acceleration, etc.) of the ride vehicle 104 along the track 102. The user control or input may allow the guests to select a chosen path along the track 102, such as to steer or direct the ride vehicle 104 to the first path 224 or the second path 226. In examples, the user control is configured to adjust at least one of a speed, a direction, or an acceleration of the ride vehicle 104 along the chosen path. For instance, while traversing either the first path 224 or the second path 226, the guests can adjust the speed, direction, and/or acceleration of the ride vehicle 104, such as to avoid obstacles (e.g., to steer around rocks, trees, etc.), engage obstacles (e.g., to ride over bumps or along berms), navigate the terrain, or otherwise provide a desired experience. In this manner, the guests can control (at least to some degree) their experience on the attraction.

In examples, the ride system 100 may include a fleet controller. In examples, the fleet controller may define a default position and a default pacing (e.g., a default trajectory) for the ride vehicles 104 along the track 102. For instance, the fleet controller may navigate the ride vehicles 104 along the track 102 absent user input, such as navigating the ride vehicles 104 along a default path or route and at a default speed based on ride timing, instructions, default parameters, other vehicles, etc. In such examples, the user control may adjust the position of an associated ride vehicle 104 from the default position and/or adjust the pacing of the associated ride vehicle 104 from the default pacing.

The fleet controller may provide an override control of the ride vehicles 104 along the track 102. For example, based on the chosen path, speed, and direction of the ride vehicles 104, the fleet controller may override user control of one or more ride vehicles 104, such as to ensure ride timing, limit stoppages, maintain distance requirements, etc. In one implementation, the fleet controller may override user control based on a proximity of a ride vehicle 104 to a boundary (e.g., a track boundary 232 or a vehicle boundary 234). For instance, the track boundary 232 may be a limit of traversable terrain, such as defined during track construction or dynamically adjusted based on track maintenance, damage, etc. The vehicle boundary 234 may be a minimum distance away from the ride vehicle 104 (e.g., a buffer zone, a safety zone, etc.). The vehicle boundary 234 may be a preset distance, or the distance may adjust based on ride characteristics (e.g., increased distance with increasing vehicle speed, and vice-versa). As a ride vehicle 104 nears a boundary, the fleet controller may step in and override user control to adjust, as needed, such as to avoid contact with the boundary, to move the vehicle away from the boundary, or the like.

In examples, the fleet controller may be configured to override the adjusted position and the adjusted pacing (as adjusted by user control) based on a track threshold. For example, the fleet controller may limit the adjusted speed based on preset limits, the current flow rate of vehicles along the track 102, the speed of the vehicle ahead of the ride vehicle 104, a grade of the terrain (e.g., reducing speed on downhill sections of the track 102), etc. In some examples, the fleet controller may limit the vehicle's speed based on a position of the ride vehicle 104 away from the default position (e.g., based on the lateral position of the ride vehicle 104 in the track 102). For instance, as the ride vehicle 104 moves away from the default position (e.g., to the left or right of default position, as the ride vehicle 104 nears a track boundary 232, etc.), the fleet controller may reduce the maximum allowable speed of the ride vehicle 104. In this manner, the allowable speed may be the fastest near the default position, and decrease with distance away from the default position. Similarly, the fleet controller may limit the vehicle's speed based on an orientation of the ride vehicle 104 relative to a nominal trajectory (e.g., the default trajectory). For instance, the allowable speed may decrease as the ride vehicle 104 turns away from the nominal or default trajectory.

In examples, the fleet controller may be configured to control a flow of the ride vehicles 104 along the alternative paths. For instance, the fleet controller may override user control to send one or more ride vehicles 104 along one alternative path based on an anomaly in another alternative path. Such anomalies may include an inoperable vehicle in the ride path, road damage, undesired debris, loss of attraction elements, or maintenance operations, among other anomalies to normal operation. In this manner, the fleet controller may automatically divert ride vehicles 104 to maintain efficient operations of the attraction. Depending on the application, the fleet controller may be a wayside controller, such as a centralized controller in communication with all ride vehicles 104 on the track 102.

Figure 3:
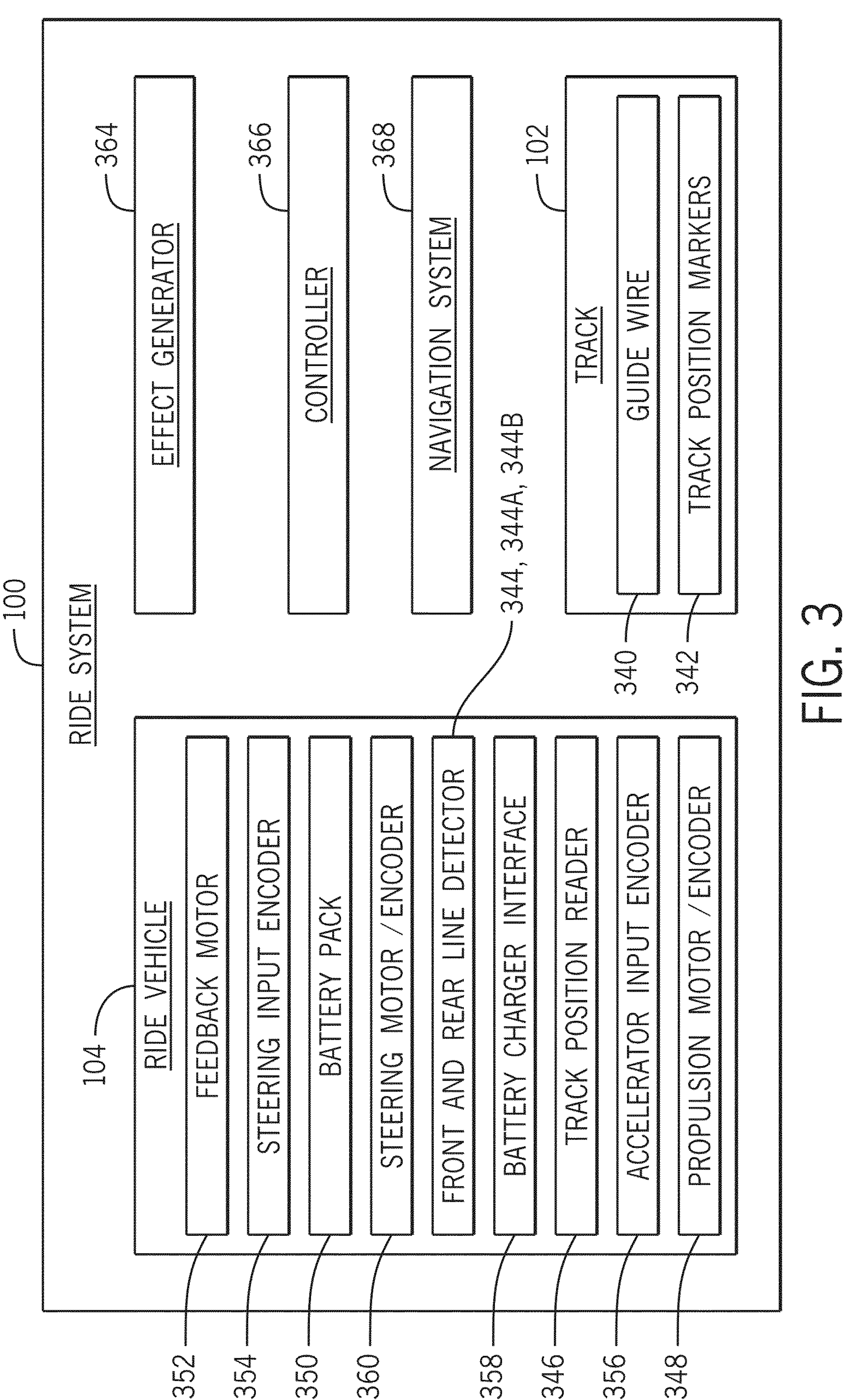
FIG. 3 illustrates a block diagram of an example ride system.

FIG. 3 illustrates a block diagram of the ride system 100. The ride system 100 may include means of determining the position of the ride vehicles 104 along the track 102. For example, the track 102 may include a guide wire 340. The guide wire 340 may run along the track 102, such as along the center of the track 102, along an edge of the track 102, adjacent the track 102, along each path of the track 102, or the like. In examples, the guide wire 340 may define the default position of the ride vehicles 104 along the track 102, such as the ride vehicles 104 following the guide wire 340 absent user control. Depending on application, the guide wire 340 may be positioned below the track surface, on or integrated with the track surface, or above the track surface.

In examples, the track 102 may include track position markers 342 (e.g., modules, beacons, signal markers, visual markers, etc.). The track position markers 342 may be spaced along the track 102, such as equidistantly or at varying distances from one another, to facilitate a position determination of the ride vehicles 104 along the track 102. For example, a detection of the track position markers 342 may help to identify where the ride vehicle 104 is at along the track 102, a pacing of the ride vehicle 104 along the track 102, or the like. Depending on application, the track position markers 342 may be positioned below the track surface, on or integrated with the track surface, or above the track surface.

The ride vehicle 104 may include one or more line detectors 344, such as a front line detector 344A and a rear line detector 344B, configured to detect the guide wire 340. The front line detector 344A may be positioned at or adjacent the front of the ride vehicle 104, and the rear line detector 344B may be positioned at or adjacent the rear of the ride vehicle 104, such as at a distance away from the front line detector 344A. The front line detector 344A may detect the position of the guide wire 340 relative to the front of the ride vehicle 104, and the rear line detector 344B may detect the position of the guide wire 340 relative to the rear of the ride vehicle 104. In this manner, a trajectory of the ride vehicle 104 relative to the guide wire 340 may be determined, such as determining the ride vehicle 104 is angling away from the guide wire 340, towards the guide wire 340, or moving generally parallel to the guide wire 340 (e.g., based on the difference in distances of the line detectors 344 to the guide wire 340). Absent user control, the line detectors 344 may allow the ride vehicle 104 to follow the guide wire 340. In examples, a lateral position of the ride vehicle 104 along the track 102 (e.g., relative to track boundaries) may be determined based on determined distances of the line detectors 344 from the guide wire 340. For example, a threshold distance away from the guide wire 340 (e.g., a minimum distance or a maximum distance) may define a track boundary 232.

The ride vehicle 104 may include a track position reader 346. The track position reader 346 may detect the track position markers 342 in the track 102. Detection of the track position markers 342 may determine a position of the ride vehicle 104 along the track 102. For example, the track position markers 342 may be tied to respective positions along the track 102, such that a detection of a particular track position marker may determine the location of the ride vehicle 104 in the attraction. In some examples, the location of the ride vehicle 104 may be determined based on a count of detected track position markers 342. For instance, a running detection of one track position marker may determine a first position along the track 102, a running detection of two track position markers 342 may determine a second position along the track 102, and so on. In some examples, the speed of the ride vehicle 104 may be determined based on the detected track position markers 342, such as based on a known distance between adjacent track position markers 342, a frequency of detecting track position markers 342, etc.

The ride vehicle 104 may include power and propulsion systems. For instance, the ride vehicle 104 may include a propulsion motor/encoder 348 (e.g., an electric motor) to drive one or more wheels to move the ride vehicle 104 along the track 102. In examples, the ride vehicle 104 may include a battery pack 350, such as to power the motor 348 and/or other electric loads of the ride vehicle 104.

The ride vehicle 104 may include a feedback module 352. The feedback module 352 may provide feedback to the driver and/or passengers of the ride vehicle 104. For instance, the feedback module 352 may provide steering wheel feedback (e.g., vibrations), haptic feedback, audio feedback (e.g., motor sounds), visual feedback (e.g., via an onboard display), or the like, such as in the form of warnings or to match the terrain or driver input.

The ride vehicle 104 may include other features or components. For example, the ride vehicle 104 may include one or more encoders providing feedback or input for navigation or control. Example encoders may include a steering input encoder 354 to detect a steering input from the driver, and an accelerator input encoder 356 to detect an acceleration input from the driver, among other encoders (e.g., a brake input encoder, etc.). In some examples, the ride vehicle 104 may include a battery charger interface 358 for charging the battery pack 350 (e.g., to plug the battery pack 350 into a charger), a steering motor/encoder 360 for adjusting a steering angle of the ride vehicle 104, and other features based on application.

In examples, the ride system 100 may include an effector generator 364. The effect generator 364 may provide one or more ride effects, such as to provide an immersive ride experience based on vehicle positioning and control. The ride effects may be visual effects, audio effects, or physical effects, among other effects, or any combination thereof. The effect generator 364 may trigger or generate ride effects to bias the ride vehicle 104 to the default position or the default pacing. For example, virtual or actual objects or ride sets may be triggered to cause the ride vehicle 104 to steer a certain direction or control the vehicle's velocity (e.g., to induce the driver to speed up or slow down). For example, virtual or actual elements may move the ride vehicle 104 to a desired path or position (e.g., via an avalanche, a bridge collapse, a landslide, a dynamic road closure, a berm, etc.). In this manner, the effect generator 364 may generate one or more ride effects off the ride vehicle 104.

In some examples, the effect generator 364 may generate the ride effects onboard the ride vehicle 104. In such examples, the ride effects may reinforce the action(s) the ride vehicle 104 is taking (e.g., at least one of the adjusted position or the adjusted pacing described above). Example onboard ride effects may include engine noise, braking noise, tactile feedback, steering and/or accelerator input override, displayed content, etc. In examples, the effect generator 364 may be embodied in the feedback module 352 of the ride vehicle 104.

With continued reference to FIG. 3, the ride system 100 includes a controller 366. The controller 366 may be the fleet controller, described above. For example, the controller 366 may be configured to provide an override control of a ride vehicle 104, such as to move the ride vehicle 104 towards a default position and/or a default pacing, to override user control of the ride vehicle 104, etc. Depending on application, the controller 366 may be onboard the ride vehicle 104 or offboard the ride vehicle 104 (e.g., wayside).

In examples, the ride system 100 includes a navigation system 368. The navigation system 368 may be configured to control a position of the ride vehicle 104 along the track 102, such as in a manner described above. In examples, the navigation system 368 may include sensors and/or logic to determine the position of the ride vehicle 104 along the track 102. The navigation system 368 includes an onboard controller configured to receive a user input for a desired position of the ride vehicle 104 along the track 102. For example, the onboard controller may include the steering input encoder 354 and the accelerator input encoder 356.

The navigation system 368 may include a wayside controller (e.g., controller 366). The wayside controller may be in communication with the onboard controller. The wayside controller may be configured to compare the user input for the desired position against a threshold, and adjust the desired position of the ride vehicle 104 based on the threshold. For example, the wayside controller may be configured to adjust a speed and a steering input so that the desired position is within the threshold. For instance, the wayside controller may be configured to adjust the desired speed, direction, or acceleration of the ride vehicle 104 (e.g., as received from user input or control) based on a proximity to a boundary (e.g., a track boundary 232, a proximity to a nearby vehicle or object, spatial constraints, a velocity limit, etc.). In some examples, the wayside controller may define a default trajectory (e.g., a minimum speed or pacing, and a nominal position) of the ride vehicle 104 along the track 102. In examples, the wayside controller may dynamically update or define the default trajectory based on current ride conditions. For example, the default trajectory may be adjusted based on track anomalies, vehicle anomalies, user error, etc.

In examples, the wayside controller may be configured to override user input to direct the ride vehicle 104 to an attraction element. For instance, if a particular attraction element is key or essential to the attraction, the wayside controller may override user control to direct the ride vehicles 104 to the attraction element. In like manner, the wayside controller may override user input to direct one or more ride vehicles 104 along a particular path, such as to alleviate track congestion or based on detected anomalies.

Figure 4:
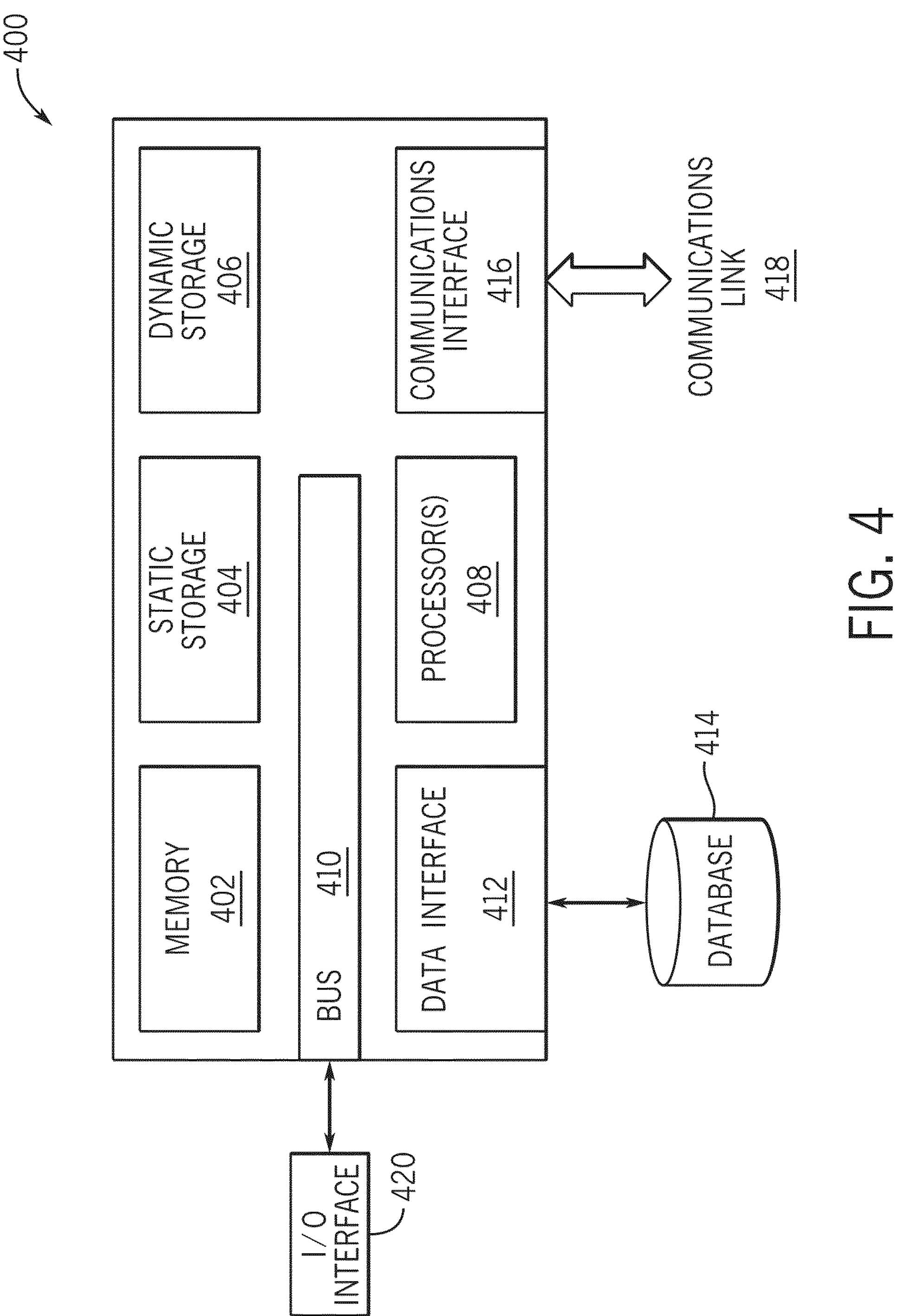
FIG. 4 illustrates an example computing system.

FIG. 4 illustrates an example computing system 400 for implementing various examples described herein. For example, in various embodiments, components of the ride system 100 or other systems described herein may be implemented by one or several computing systems 400. This disclosure contemplates any suitable number of computing systems 400. For example, the computing system 400 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 400 may include one or more computing systems; be unitary or distributed; span multiple locations; span multiple machines; span multiple data centers; or reside in a cloud, which may include one or more cloud components in one or more networks.

Computing system 400 includes a bus 410 (e.g., an address bus and a data bus) or other communication mechanism for communicating information, which interconnects subsystems and devices, such as processor 408, memory 402 (e.g., RAM), static storage 404 (e.g., ROM), dynamic storage 406 (e.g., magnetic or optical), communications interface 416 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 420 (e.g., keyboard, keypad, mouse, microphone, display). In particular embodiments, the computing system 400 may include one or more of any such components.

In particular embodiments, processor 408 includes hardware for executing instructions, such as those making up a computer program. For example, a processor 408 may execute instructions for various components of the ride system 100 or other systems described herein. The processor 408 circuity includes circuitry for performing various processing functions, such as executing specific software to perform specific calculations or tasks. In particular embodiments, I/O interface 420 includes hardware, software, or both, providing one or more interfaces for communication between computing system 400 and one or more I/O devices. Computing system 400 may include one or more of these I/O devices, where appropriate. One or more of these I/O devices may enable communication between a person and computing system 400.

In particular embodiments, the communications interface 416 includes hardware, software, or both providing one or more interfaces for communication (such as, for example, packet-based communication) between computing system 400 and one or more other computer systems or one or more networks. One or more memory buses (which may each include an address bus and a data bus) may couple processor 408 to memory 402. Bus 410 may include one or more memory buses, as described below. In particular embodiments, one or more memory management units (MMUs) reside between processor 408 and memory 402 and facilitate accesses to memory 402 requested by processor 408. In particular embodiments, bus 410 includes hardware, software, or both coupling components of computing system 400 to each other.

According to particular embodiments, computing system 400 performs specific operations by processor 408 executing one or more sequences of one or more instructions contained in memory 402. For example, instructions for the ride system 100 or other systems described herein (e.g., to perform the operations described herein) may be contained in memory 402 and may be executed by the processor 408.

Such instructions may be read into memory 402 from another computer readable/usable medium, such as static storage 404 or dynamic storage 406. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 408 for execution. Such a medium may take many forms, including but not limited to, nonvolatile media and volatile media. Non-volatile media includes, for example, optical or magnetic disks, such as static storage 404 or dynamic storage 406. Volatile media includes dynamic memory, such as memory 402.

Computing system 400 may transmit and receive messages, data, and instructions, including program, e.g., application code, through communications link 418 and communications interface 416. Received program code may be executed by processor 408 as it is received, and/or stored in static storage 404 or dynamic storage 406, or other storage for later execution. A database 414 may be used to store data accessible by the computing system 400 by way of data interface 412. In various examples, communications link 418 may communicate with the ride system 100 or other systems described herein.

Figure 5:
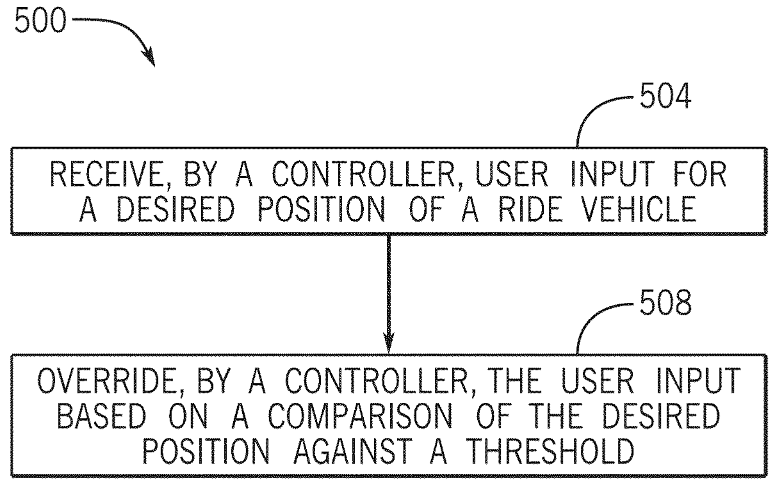
FIG. 5 illustrates an example method for controlling a position of a ride vehicle along a track.

Turning to FIG. 5, an example method 500 for controlling a position of a vehicle (e.g., the ride vehicle 104 along the track 102) is depicted. The method 500 may be implemented using the various systems described herein, such as the ride system 100 or the computing system 400 (e.g., the processor 408). At step 504, method 500 includes receiving, by a controller (e.g., onboard controller of navigation system 368), user input for a desired position of the ride vehicle 104. Step 504 may include receiving user input selecting a chosen path and adjusting a speed and a direction of the ride vehicle 104 along the chosen path. Step 504 may include receiving user input to adjust the position of the ride vehicle 104 from a default position on the track 102 (e.g., to move the ride vehicle 104 left or right of a default, nominal position, as desired). Step 504 may include receiving user input to adjust the pacing of the ride vehicle 104 from a default pacing (e.g., to speed up or slow down the ride vehicle 104, as desired).

At step 508, method 500 includes overriding, by a controller (e.g., wayside controller of navigation system 368, fleet controller, controller, etc.), the user input based on a comparison of the desired position against a threshold. For example, the controller may override user or guest control when the ride vehicle 104 approaches a threshold boundary, speed, or direction. Step 508 may include overriding the user input of the ride vehicle 104 based on the chosen path, speed, and direction. For example, step 508 may include overriding the adjusted position and pacing/speed based on track thresholds (e.g., to adjust the ride vehicle 104 away from track boundaries or dynamic limits). Step 508 may include overriding user input to control a flow of one or more ride vehicles 104 along the track 102, such as to direct one or more ride vehicles 104 along one path based on an anomaly in another path. Step 508 may include overriding user input based on a proximity of the ride vehicle 104 to a boundary (e.g., such as to move the ride vehicle 104 away from the track boundary 232, the vehicle boundary 234, or any other boundary).

Although described with reference to a ride system or attraction, the features described herein may be implemented in other applications. For example, the concepts described herein may be implemented in semi-guided tours (e.g., via scooters, electric conveyance vehicles (ECVs), all-terrain vehicles (ATVs), etc.), where some degree of user control is provided to individualize an experience but supervisory/overlay control is maintained (e.g., to control fleet positioning, prevent congestion or stoppages, etc.). Other alternative implementations may include a warehouse application, where one or more forklifts are controlled manually with limited freedom, with supervisory/overlay control maintaining sufficient clearance.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms “a” and “an” are taken to mean “one”, “at least one” or “one or more”. Unless otherwise required by context, singular terms used herein shall include pluralities and plural terms shall include the singular.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”. Words using the singular or plural number also include the plural and singular number, respectively. Additionally, the words “herein,” “above,” and “below” and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A ride system comprising:

a track comprising uneven terrain;

a plurality of ride vehicles positioned on the track, each ride vehicle of the plurality of ride vehicles adapted to traverse the uneven terrain along a respective chosen path based on respective user control, the user control configured to select the chosen path and adjust a speed and a direction of the associated ride vehicle along the chosen path; and a fleet controller configured to provide an override control of the ride vehicles along the track based on the chosen path, the speed, and the direction of each ride vehicle of the plurality of ride vehicles, wherein the override control is configured to navigate the plurality of ride vehicles to maintain distance requirements relative to one another.

2. The ride system of claim 1, wherein the chosen path is selected from alternative paths along a section of the track, the alternative paths defined along different vertical levels of the track.

3. The ride system of claim 2, wherein the alternative paths provide differing attraction elements from one another.

4. The ride system of claim 2, wherein the fleet controller is configured to send one or more of the plurality of ride vehicles along one alternative path based on an anomaly in another alternative path.

5. The ride system of claim 1, wherein the fleet controller is configured to override the user control based on a proximity of a ride vehicle to a boundary, and wherein the fleet controller is configured to adjust the boundary dynamically based on a changing condition of the track or one or more of the plurality of ride vehicles.

6. A ride system comprising:

a track;

a plurality of ride vehicles configured to traverse the track;

a fleet controller configured to navigate the plurality of ride vehicles along a default path and at a default speed along the track absent user input, wherein the default path and the default speed is adjusted dynamically based on a detected condition of the track or a ride vehicle of the plurality of ride vehicles; and a respective user control for each of the plurality of ride vehicles, the user control configured to:

adjust a position of an associated ride vehicle from the default path;

adjust a speed of the associated ride vehicle from the default speed; or a combination thereof.

7. The ride system of claim 6, wherein the fleet controller is configured to override at least one of the position or the speed adjusted by the user control.

8. The ride system of claim 7, wherein the fleet controller is configured to override the speed adjusted by the user control based on the position of the associated ride vehicle away from the default path.

9. The ride system of claim 7, wherein the fleet controller is configured to override the speed adjusted by the user control based on an orientation of the associated ride vehicle relative to a default trajectory.

10. The ride system of claim 6, further comprising an effect generator configured to generate one or more ride effects adapted to bias the plurality of ride vehicles to the default path or the default speed.

11. The ride system of claim 6, further comprising an effect generator configured to generate, onboard the plurality of ride vehicles, one or more ride effects that reinforce at least one of the position or the speed adjusted by the user control.

12. The ride system of claim 6, wherein the track comprises uneven ground terrain defining a grade, and wherein the fleet controller is configured to override the speed adjusted by the user control based on the grade.

13. The ride system of claim 6, wherein the fleet controller is a wayside controller.

14. A ride system comprising:

a ride vehicle adapted to traverse uneven ground terrain of a track; and a navigation system configured to control a position of the ride vehicle along the track, the navigation system comprising:

an onboard controller configured to receive a user input for a desired position of the ride vehicle along the track; and a wayside controller in communication with the onboard controller, the wayside controller configured to determine a track threshold based on a detected condition, compare the user input for the desired position against the track threshold, and adjust the desired position of the ride vehicle based on the track threshold.

15. The ride system of claim 14, wherein the wayside controller is configured to adjust a speed and a steering input so that the desired position is within the track threshold.

16. The ride system of claim 14, wherein the wayside controller defines a default trajectory of the ride vehicle along the track.

17. The ride system of claim 16, wherein the wayside controller is configured to navigate the ride vehicle along the default trajectory along the track absent the user input.

18. The ride system of claim 17, wherein the wayside controller is configured to adjust the desired speed, direction, or acceleration based on a proximity of the ride vehicle to a boundary.

19. The ride system of claim 14, wherein the onboard controller is configured to receive a second user input for a desired speed, direction, or acceleration of the ride vehicle.

20. The ride system of claim 14, wherein the wayside controller is configured to override the user input to direct the ride vehicle to an attraction element.

* * * * *